(12) United States Patent
Buergi et al.

(10) Patent No.: US 9,062,789 B2
(45) Date of Patent: Jun. 23, 2015

(54) ACTUATING DEVICE FOR ACTUATING VALVES

(75) Inventors: Stefan Buergi, Basadingen (CH); Juergen Stumpp, Klettgau (DE)

(73) Assignee: Georg Fischer Rohrleitungssysteme AG, Schaffhausen (SE)

( * ) Notice: Subject to any disclaimer, the term of this patent is extended or adjusted under 35 U.S.C. 154(b) by 327 days.

(21) Appl. No.: 13/377,993

(22) PCT Filed: Jun. 8, 2010

(86) PCT No.: PCT/EP2010/057955
§ 371 (c)(1),
(2), (4) Date: Dec. 13, 2011

(87) PCT Pub. No.: WO2010/145965
PCT Pub. Date: Dec. 23, 2010

(65) Prior Publication Data
US 2012/0080628 A1    Apr. 5, 2012

(30) Foreign Application Priority Data
Jun. 16, 2009    (EP) .................................... 09162814

(51) Int. Cl.
*F16K 31/60* (2006.01)
*F16K 37/00* (2006.01)
*F16K 35/02* (2006.01)

(52) U.S. Cl.
CPC ........... *F16K 37/0041* (2013.01); *F16K 31/605* (2013.01); *F16K 35/025* (2013.01); *F16K 31/60* (2013.01); *F16K 35/02* (2013.01)

(58) Field of Classification Search
CPC ..... F16K 37/0041; F16K 35/02; F16K 31/60; F16K 35/025; F16K 31/605
USPC ................ 251/292, 90; 74/548; 137/383, 385
See application file for complete search history.

(56) References Cited

U.S. PATENT DOCUMENTS

| | | | | |
|---|---|---|---|---|
| 1,754,310 A | * | 4/1930 | Ellenberger | 137/359 |
| 1,878,569 A | * | 9/1932 | Zolleis | 74/548 |
| 2,540,371 A | * | 2/1951 | Jacobsen | 251/267 |
| 2,986,371 A | * | 5/1961 | Knox | 251/187 |
| 3,026,742 A | | 3/1962 | Bruno | |
| 3,311,121 A | * | 3/1967 | Morrell | 137/15.19 |
| 3,384,339 A | * | 5/1968 | Cornell, III | 251/291 |
| 3,501,993 A | * | 3/1970 | Swenson | 411/393 |
| 4,505,451 A | * | 3/1985 | Jonas | 251/285 |
| 4,519,581 A | * | 5/1985 | Paul | 251/268 |
| 4,589,629 A | * | 5/1986 | Gaffney et al. | 251/288 |
| 4,815,693 A | | 3/1989 | James et al. | |
| 4,842,009 A | * | 6/1989 | Reback | 251/291 |
| 5,025,826 A | * | 6/1991 | Schoepe et al. | 251/291 |
| 5,115,834 A | * | 5/1992 | Champagne | 137/385 |
| 5,236,172 A | * | 8/1993 | Friemoth et al. | 137/385 |
| 5,353,833 A | * | 10/1994 | Martinez | 137/385 |

(Continued)

FOREIGN PATENT DOCUMENTS

DE    19926867 A1    12/2000
EP    1469242 A1    10/2004

*Primary Examiner* — John Bastianelli
(74) *Attorney, Agent, or Firm* — Bachman & LaPointe, P.C.

(57) ABSTRACT

An actuating device (4) for actuating valves, having a spindle (5), wherein the actuating device is designed as a hand wheel (4) with a locking element (32) and with an electric feedback device (6), characterized in that the locking element (32) is formed in one piece and is arranged integrally in the hand wheel (4).

21 Claims, 5 Drawing Sheets

(56) References Cited

U.S. PATENT DOCUMENTS

| | | | |
|---|---|---|---|
| 5,803,681 A * | 9/1998 | Landwerlen | 409/134 |
| 5,887,850 A | 3/1999 | Ruffalo | |
| 6,007,049 A * | 12/1999 | Wass et al. | 251/144 |
| 6,267,139 B1 * | 7/2001 | Miklo et al. | 137/554 |
| 6,347,784 B1 | 2/2002 | Philipps-Liebich et al. | |
| 6,460,383 B1 * | 10/2002 | Wadsworth, Jr. | 137/385 |
| 7,011,291 B2 | 3/2006 | Miklo et al. | |
| 2009/0121170 A1 * | 5/2009 | Ito et al. | 251/129.12 |

\* cited by examiner

ACTUATING DEVICE FOR ACTUATING VALVES

BACKGROUND OF THE INVENTION

The present invention relates to an actuating device for actuating valves having a spindle, wherein the actuating device is formed as a hand wheel having a locking element and a preferably electric feedback device.

In pipeline construction, valves are used to regulate flow rates of various media. Valves which are formed with hand wheels as actuating devices must be protected against unauthorized actuation by means of locking elements.

On the basis of this prior art, it is an object of the invention to specify an actuating device which operates as reliably as possible and can be produced as simply as possible.

SUMMARY OF THE INVENTION

The object is achieved by an actuating device for actuating valves having a spindle, wherein the actuating device is formed as a hand wheel having a locking element and an electric feedback device, characterized in that the locking element is formed in one piece and is arranged integrally in the hand wheel.

It is advantageous if the valve cannot be actuated by unauthorized persons. This is achieved by a one-piece locking element being arranged integrally in the hand wheel in a manner interacting with the spindle. The locking element is formed to fix the axial and radial positions of the hand wheel with respect to the spindle. The locking element has at least one resilient finger, formed perpendicularly to the spindle axis, to fix the axial position of the hand wheel with respect to the spindle, and has a slide, formed parallel to the spindle axis, to fix the radial position of the hand wheel with respect to the spindle.

BRIEF DESCRIPTION OF THE DRAWINGS

An exemplary embodiment is described with reference to the figures, in which.

DETAILED DESCRIPTION

Figure 1:
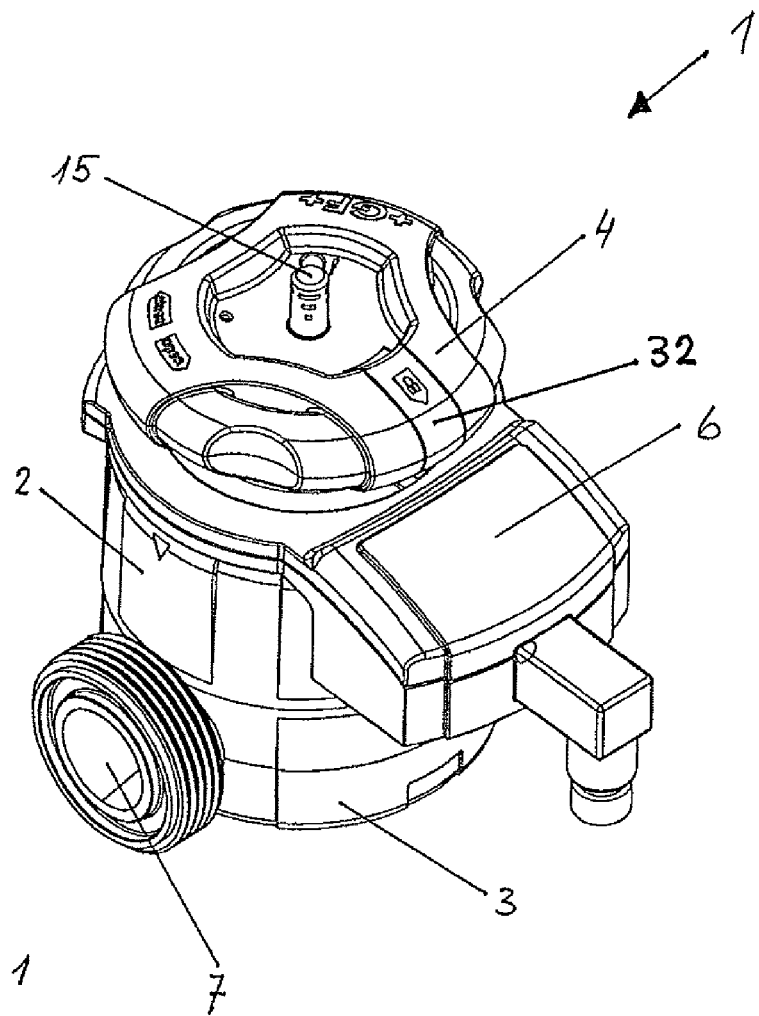
FIG. 1 shows a perspective view of a valve having the actuating device according to the invention.

FIG. 1 illustrates a valve 1, for example a diaphragm valve, in perspective. The valve 1 consists of an upper housing part 2, a mating lower housing part 3, an actuating member, illustrated here as a hand wheel 4 having a locking element 32, an extension 15 of a spindle 5 and an electric feedback device 6.

Figure 8:
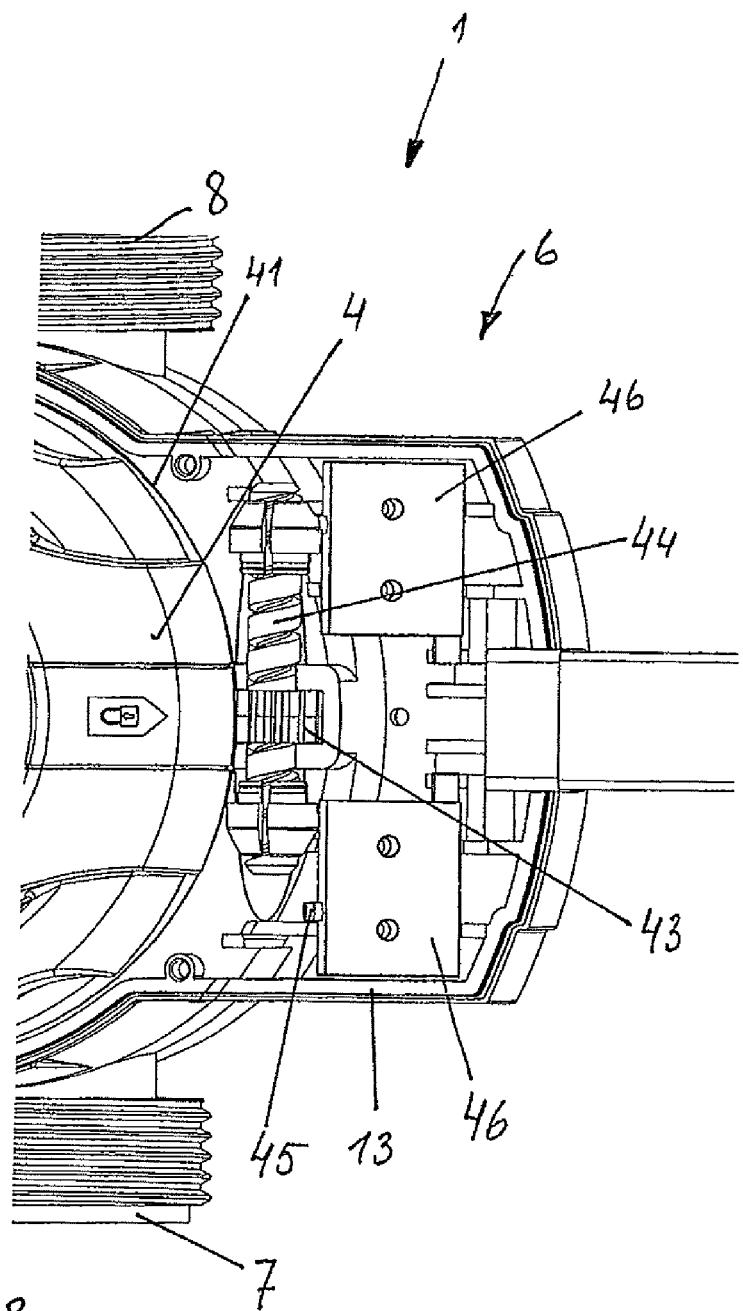

The lower housing part 3 has three openings, of which only one pipe coupling 7 can be seen in FIG. 1 and another 8 in FIG. 8.

Figure 2:
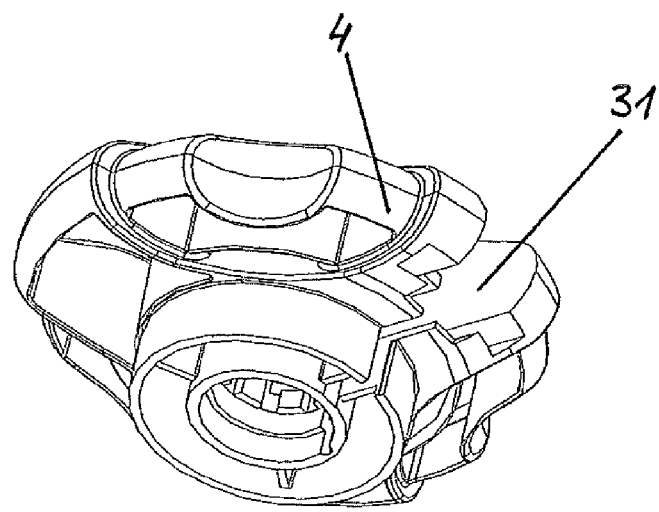
FIG. 2 shows a perspective view of the actuating device formed as a hand wheel.

FIG. 2 illustrates the hand wheel 4 in perspective. The hand wheel 4 has a radially formed cutout (recess) 31, in which the locking element 32 can be accommodated in a radially displaceable manner.

Figure 3:
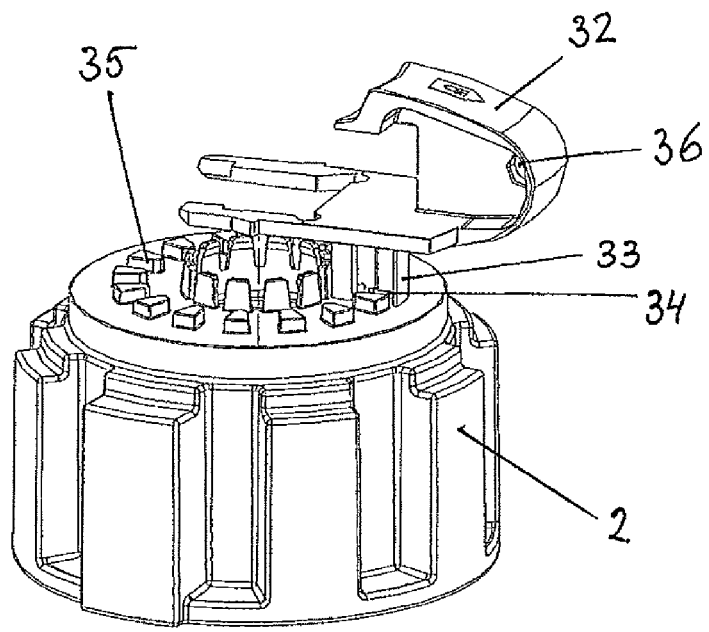
FIG. 3 shows a perspective view of the locking element and of the upper housing part of the valve in a first end position of the locking element.
Figure 4:
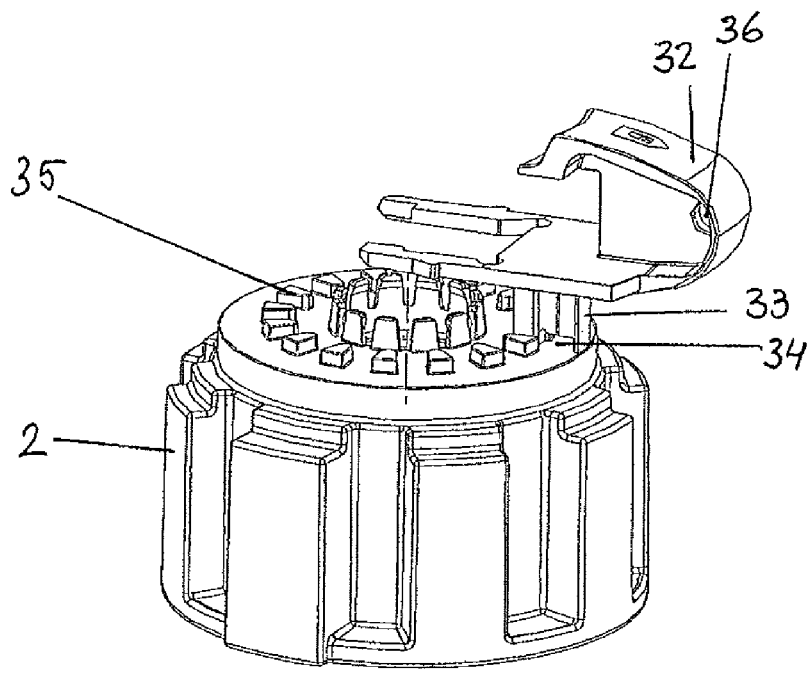
FIG. 4 shows a perspective view of the locking element and of the upper housing part of the valve in a second end position of the locking element.
Figure 5:
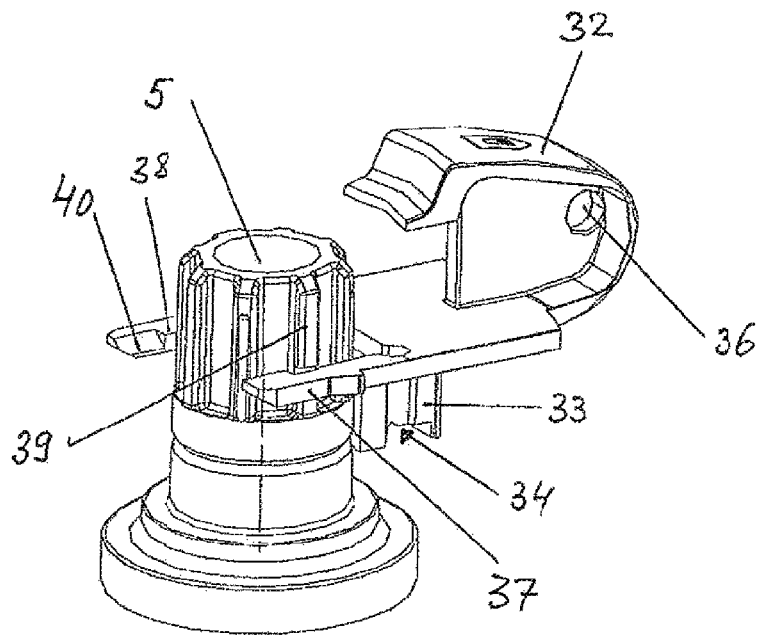
FIG. 5 shows a perspective view of the locking element and of the spindle of the valve in the first end position.
Figure 6:
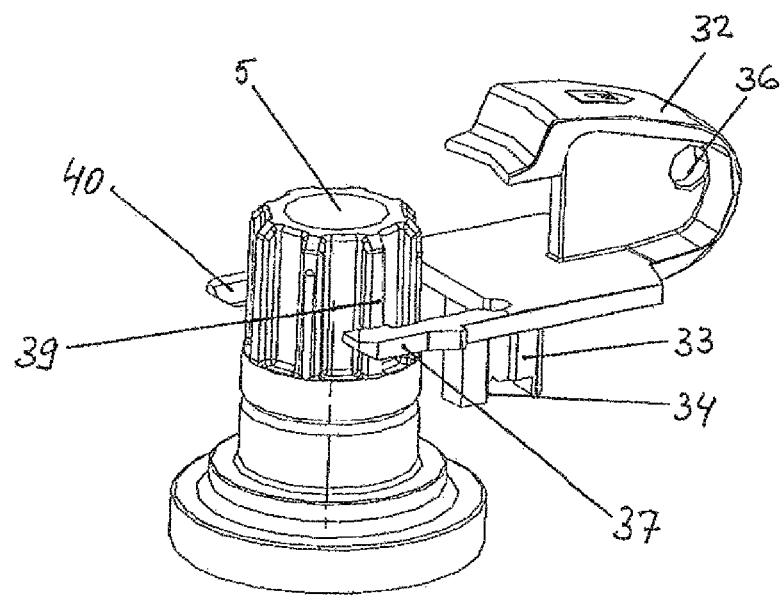
FIG. 6 shows a perspective view of the locking element and of the spindle of the valve in the second end position.

The locking element 32 is illustrated interacting with the upper housing part 2 in FIGS. 3 and 4 and interacting with the spindle 5 in FIGS. 5 and 6. The locking element 32 has a slide 33, which extends as a perpendicularly arranged and radially displaceable plate from the locking element 32 to the upper side of the upper housing part 2.

FIG. 3 illustrates the slide 33 in the radially inserted state with respect to the spindle axis, i.e. in the normal operating state of the valve 1. The slide 33 has a through-opening 34, through which the cams (upward projections) 35, which are formed on the upper side of the upper housing part 2, pass during the rotational movement of the hand wheel 4. In the position shown in FIG. 3, the valve 1 can be actuated with the hand wheel 4. However, in the position shown in FIG. 4, the opening 34 is no longer positioned to allow the cams 35 to pass, thus preventing actuation of the valve with the hand wheel.

FIG. 4 illustrates the slide 33 in the radially withdrawn state. In this position, the radial position of the hand wheel 4 is fixed. The hand wheel 4 cannot be actuated and the spindle 5 cannot be rotated in this position. In order to secure the valve in the locked position, the locking element 32 has a bore 36, into which a padlock (not illustrated here) or any other suitable security device can be introduced. This prevents unauthorized actuation of the valve 1.

As illustrated in FIGS. 5 and 6, the locking element 32 further has two resilient fingers 37, 38, which are formed in a manner interacting with the spindle 5. The resilient fingers 37, 38 engage with further cams (splines) 39, which are formed on the periphery of the spindle 5. The resilient fingers 37, 38 prevent unauthorized removal of the hand wheel 4 from the spindle 5. The axial position of the hand wheel 4 with respect to the spindle 5 is fixed. It is only possible to pull off the hand wheel 4 when the locking element 32 is in the normal operating state, as illustrated in FIG. 5. It is only by means of a special tool that the resilient fingers 37, 38 can be moved away from the spindle 5 towards the outside, so that the hand wheel 4 can be pulled off the spindle 5. The hand wheel 4 can only be pulled off when the locking element 32 is secured against radial movement. For this purpose, the resilient fingers 37, 38 have oblique surfaces 40, which can be pressed outwards by the special tool. It can be seen in FIG. 6 how the end of the resilient finger 37 engages in a recess in the cam 39 of the spindle 5, thereby preventing the hand wheel 4 from being pulled off in this operating position. With the hand wheel 4 described here, having the locking element 32, the hand wheel 4 can be completely secured both in the radial direction and in the axial direction using a single component.

Figure 7:
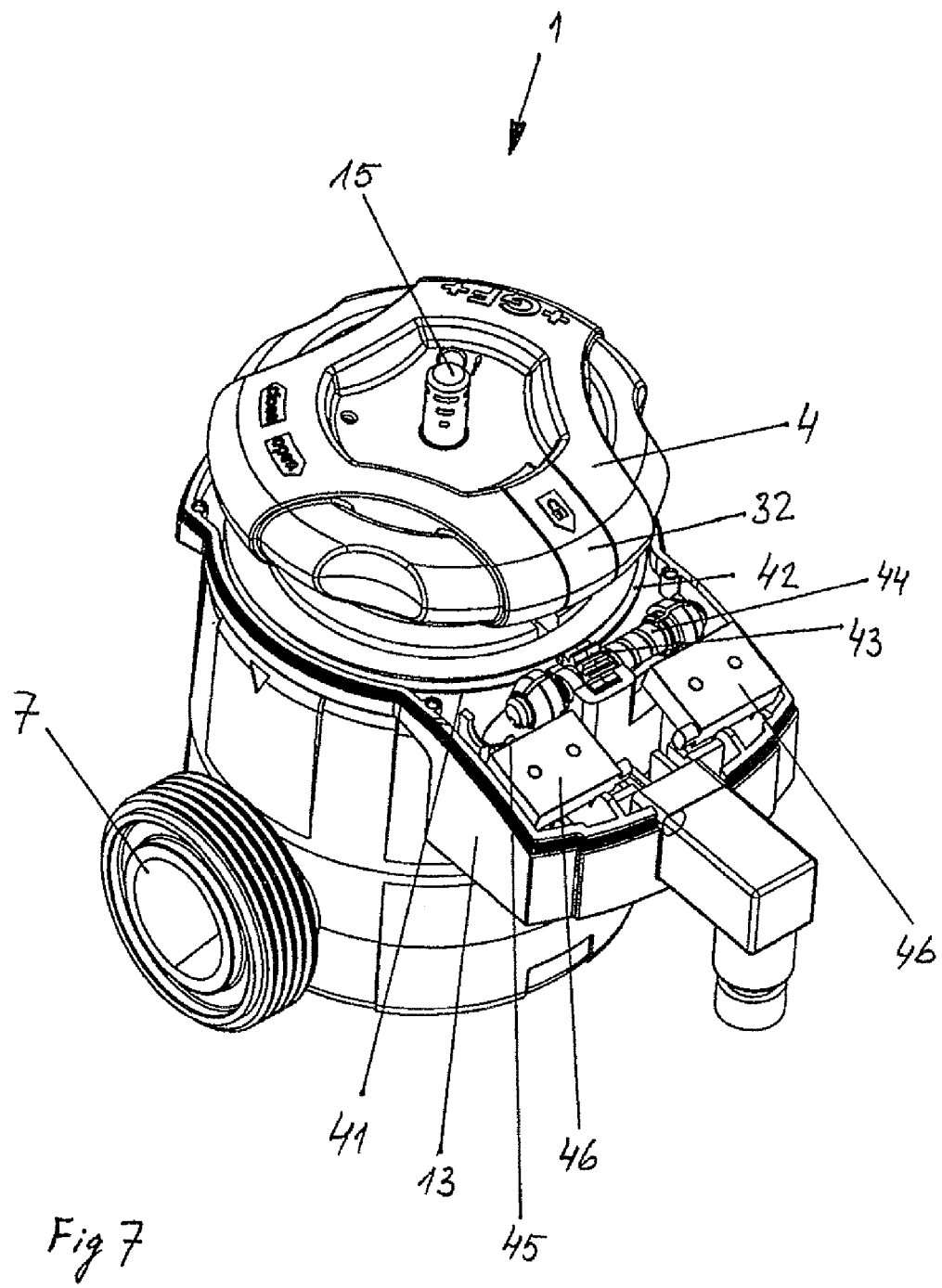
FIG. 7 shows a perspective view of an electric feedback device and FIG. 8 shows a view of the electric feedback device of FIG. 7.

FIGS. 7 and 8 illustrate the electric feedback device 6 for providing feedback on the position of the hand wheel 4 and thus the position of the shut-off element of the valve 1. The electric feedback device 6 is arranged in the spindle housing 13 of the upper housing part 2 of the valve 1. Arranged in the upper housing part 2 is a ring 41, which is connected to the spindle 5 and has a screw thread 42 formed on the annular rim. The screw thread 42 interacts via a gear wheel 43 with a worm gear mechanism 44. The worm gear mechanism 44 drives two switching cams 45, which execute a linear movement. As a result of this, the rotational movement of the hand wheel 4 is converted into a linear movement of the switching cams 45.

The switching cams 45 interact with microswitches 46, which are able to send electric pulses to a position indicator (not illustrated here).

The invention claimed is:

1. In combination, a valve having a spindle and actuating device for actuating valves having a spindle, the actuating device comprises a hand wheel having a locking element, wherein:
the locking element is formed in one piece and is arranged integrally in the hand wheel and secures the hand wheel in radial and axial directions;
the hand wheel has a radially formed recess;
the locking element is accommodated in the recess radially displaceable between an inserted position and a withdrawn position;
a valve body comprises a plurality of projections; and
the locking element comprises a slide having a through hole positioned to pass the projections when the locking element is in the inserted position.

2. The valve and actuating device according to claim 1, wherein the locking element has at least one resilient finger formed perpendicularly to an axis of the spindle to fix the axial position of the hand wheel with respect to the spindle.

3. The valve and actuating device according to claim 1, wherein the locking element has a slide formed parallel to an axis of the spindle to fix the radial position of the hand wheel with respect to the spindle.

4. The valve and actuating device according to claim 1, wherein the hand wheel and the locking element are formed such that it is only possible to pull off the hand wheel when the locking element is arranged in said inserted position.

5. The valve and actuating device according to claim 1, wherein the hand wheel is formed as a non-rising hand wheel.

6. The valve and actuating device according to claim 1, wherein an electric feedback device is arranged in a spindle housing of the valve.

7. The valve and actuating device according to claim 6, wherein the electric feedback device has microswitches which are actuated by switching cams arranged in a linearly moveable manner.

8. The valve and actuating device according to claim 7, wherein the hand wheel has a ring having a helical contour adapted to interact with a worm gear mechanism wherein rotational movement of the hand wheel is converted into a linear movement of the switching cams.

9. The valve and actuating device according to claim 7, wherein the electric feedback device is formed in a self-adjusting manner and such that it can be retrofitted.

10. The valve and actuating device of claim 1, wherein:
the locking element comprises a bore for introduction of a security device to prevent unauthorized actuation of the valve.

11. In combination, a valve having a spindle and actuating device for actuating valves having a spindle, the actuating device comprises a hand wheel having a locking element, wherein:
the locking element is formed in one piece and is arranged integrally in the hand wheel and secures the hand wheel in radial and axial directions;
the hand wheel has a radially formed recess;
the locking element is accommodated in the recess radially displaceable between an inserted position and a withdrawn position;
the hand wheel and the locking element are formed such that it is only possible to pull off the hand wheel when the locking element is arranged in said inserted position; and
the locking element comprises two resilient fingers positioned to interact with the spindle.

12. The valve and actuating device according to claim 11, wherein the two resilient fingers are positioned to engage with cams of the spindle.

13. The valve and actuating device according to claim 11, wherein the two resilient fingers are positioned to prevent removal of the handle from the spindle in said extracted position.

14. The valve and actuating device according to claim 13, wherein the two resilient fingers are positioned to allow removal of the handle from the spindle responsive to outward pressing in the inserted position.

15. The valve and actuating device according to claim 11, wherein:
a valve body comprises a plurality of projections; and
the locking element comprises a slide having a through hole positioned to pass the projections when the locking element is in the inserted position.

16. In combination, a valve having a spindle and actuating device for actuating valves having a spindle, the actuating device comprises a hand wheel having a locking element, wherein:
the locking element is formed in one piece and is arranged integrally in the hand wheel and secures the hand wheel in radial and axial directions;
the hand wheel has a radially formed recess;
the locking element is accommodated in the recess radially displaceable between an inserted position and a withdrawn position;
a valve body comprises a plurality of projections; and
the locking element comprises a slide having a through hole, wherein with the locking element in the inserted position the through hole is positioned to pass the projections during rotation of the hand wheel.

17. A valve comprising:
a valve housing;
a valve spindle extending through the housing; and
a hand wheel mounted to the spindle,
wherein:
the housing has a plurality of projections;
the hand wheel has a recess accommodating a locking element, the locking element radially displaceable between an inserted position and a withdrawn position;
the locking element comprises a slide having a through-hole position to pass the projections with the locking element in the inserted condition to allow rotation of the hand wheel; and
the projections are positioned to interfere with the slide to block rotation of the hand wheel with the slide in the inserted position.

18. The valve and actuating device according to claim 17, wherein the locking element comprises two resilient fingers positioned to interact with the spindle.

19. The valve and actuating device according to claim 18, wherein the two resilient fingers are positioned to engage with cams of the spindle.

20. The valve and actuating device according to claim 18, wherein the two resilient fingers are positioned to prevent removal of the handle from the spindle in said extracted position.

21. The valve and actuating device according to claim 20, wherein the two resilient fingers are positioned to allow removal of the handle from the spindle responsive to outward pressing in the inserted position.

* * * * *